US011477330B2

(12) United States Patent
Abe et al.

(10) Patent No.: US 11,477,330 B2
(45) Date of Patent: Oct. 18, 2022

(54) INFORMATION PROCESSING DEVICE, INFORMATION PROCESSING SYSTEM, AND NON-TRANSITORY COMPUTER READABLE MEDIUM FOR PROVIDING SUGGESTIONS TO RECONCILE AN INCONSISTENCY BETWEEN CONTENT OF RELATED DOCUMENTS

(71) Applicant: FUJIFILM Business Innovation Corp., Tokyo (JP)

(72) Inventors: Akane Abe, Kanagawa (JP); Manabu Ueda, Kanagawa (JP); Daisuke Tatsumi, Kanagawa (JP); Jun Ando, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/326,572

(22) Filed: May 21, 2021

(65) Prior Publication Data
US 2022/0159129 A1    May 19, 2022

(30) Foreign Application Priority Data
Nov. 16, 2020    (JP) .............................. JP2020-190503

(51) Int. Cl.
*H04N 1/00* (2006.01)
*G06F 3/12* (2006.01)
*G06V 10/22* (2022.01)
*G06V 30/418* (2022.01)

(52) U.S. Cl.
CPC ......... *H04N 1/00037* (2013.01); *G06F 3/121* (2013.01); *G06F 3/1207* (2013.01); *G06F 3/1239* (2013.01); *H04N 1/00074* (2013.01); *H04N 1/00082* (2013.01); *H04N 1/00331* (2013.01); *G06F 3/1265* (2013.01); *G06V 10/22* (2022.01); *G06V 30/418* (2022.01); *H04N 1/00034* (2013.01); *H04N 1/00068* (2013.01); *H04N 1/00183* (2013.01)

(58) Field of Classification Search
None
See application file for complete search history.

(56) References Cited

U.S. PATENT DOCUMENTS

| 7,123,371 | B1* | 10/2006 | Yoda | .................. H04N 1/00204 358/1.15 |
| 2007/0268513 | A1* | 11/2007 | Enloe | .................... G06F 3/1207 358/1.15 |
| 2015/0012489 | A1* | 1/2015 | Ceribelli | ................ G06Q 30/04 707/611 |
| 2017/0154384 | A1* | 6/2017 | Schroeder | .............. G06Q 40/12 |
| 2017/0221113 | A1* | 8/2017 | Katakawa | ............... G06F 13/00 |

FOREIGN PATENT DOCUMENTS

JP    6635563    B1    1/2020

* cited by examiner

*Primary Examiner* — Miya J Williams
(74) *Attorney, Agent, or Firm* — Oliff PLC

(57) ABSTRACT

An information processing device includes: a processor configured to: acquire an invoice to be processed; acquire a document related to the invoice; and perform a process of outputting a suggestion as to a predetermined matter that is to be executed next in accordance with an inconsistency between a content described in the invoice and a content described in the document.

19 Claims, 10 Drawing Sheets

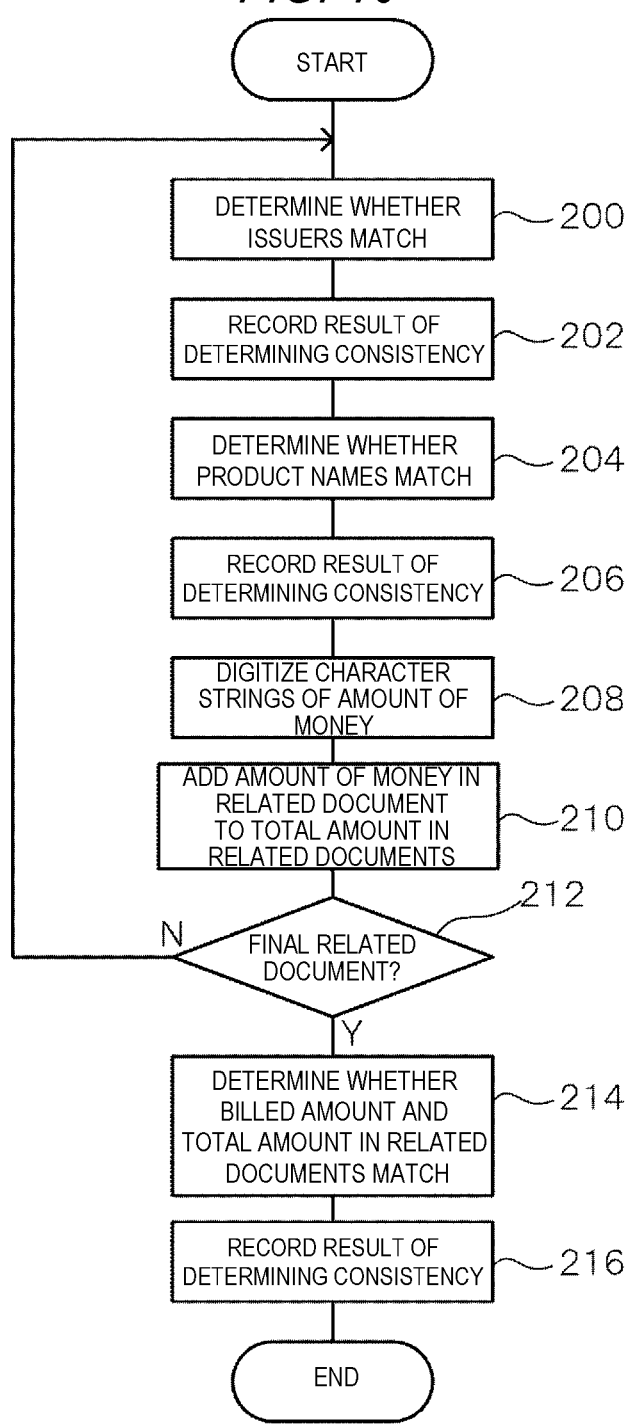

FIG. 11

ISSUER LIST

| VOUCHER No. | DETERMINATION RESULT | INVOICE ELEMENT | VOUCHER ELEMENT |
|---|---|---|---|
| 1 | MATCH | ABC CORPORATION | ABC CORPORATION |
| 2 | MISMATCH | ABC CORPORATION | ABO CORPORATION |
| ⋮ | ⋮ | ⋮ | ⋮ |

FIG. 12

PRODUCT NAME LIST

| VOUCHER No. | DETERMINATION RESULT | INVOICE ELEMENT | VOUCHER ELEMENT |
|---|---|---|---|
| 1 | MATCH | PRODUCT NAME A | PRODUCT NAME A |
| 2 | MATCH | PRODUCT NAME B | PRODUCT NAME B |
| 2 | MATCH | PRODUCT NAME C | PRODUCT NAME C |
| ⋮ | ⋮ | ⋮ | ⋮ |

FIG. 13

LIST OF AMOUNTS OF MONEY

| DETERMINATION RESULT | AMOUNT OF MONEY IN INVOICE | TOTAL AMOUNT IN RELATED DOCUMENTS |
|---|---|---|
| MISMATCH | 12,300 | 12,306 |

INFORMATION PROCESSING DEVICE, INFORMATION PROCESSING SYSTEM, AND NON-TRANSITORY COMPUTER READABLE MEDIUM FOR PROVIDING SUGGESTIONS TO RECONCILE AN INCONSISTENCY BETWEEN CONTENT OF RELATED DOCUMENTS

CROSS-REFERENCE TO RELATED APPLICATIONS

This application is based on and claims priority under 35 USC 119 from Japanese Patent Application No. 2020-190503 filed Nov. 16, 2020.

BACKGROUND

(i) Technical Field

The present disclosure relates to an information processing device, an information processing system, and a non-transitory computer readable medium.

(ii) Related Art

Japanese Patent No. 6635563 proposes an accounting processing device in which a journalizing element analysis unit verifies a journalizing element regarding an amount of money among extracted journalizing elements, reconciles journalizing element extraction results extracted by plural journalizing element extraction AIs, and displays inconsistent journalizing elements with a warning display.

SUMMARY

If there is any issue in a result of the reconciliation between an invoice and a corresponding document, it is necessary to cope with the issue in accordance with an error. The inconsistency includes, for example, an inconsistency that can be handled simply by an office staff, and an inconsistency that needs to be heard by a person in charge. Therefore, matters to be executed next are different depending on the inconsistency.

Accordingly, aspects of non-limiting embodiments of the present disclosure relate to providing an information processing device, an information processing system, and a non-transitory computer readable medium capable of reducing time required to check for an inconsistency as compared with a case where how to address inconsistency between an invoice and a document is determined only by human knowledge.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to: acquire an invoice to be processed; acquire a document related to the invoice; and perform a process of outputting a suggestion as to a predetermined matter that is to be executed next in accordance with an inconsistency between a content described in the invoice and a content described in the document.

BRIEF DESCRIPTION OF THE DRAWINGS

Exemplary embodiment(s) of the present disclosure will be described in detail based on the following figures, wherein:

FIG. 10 is a flowchart of an example of a process for determining consistency between the invoice and the related document;

FIG. 11 is a diagram illustrating an example of an issuer list;

FIG. 12 is a diagram illustrating an example of a product name list;

FIG. 13 is a diagram illustrating an example of a list of amounts of money;

DETAILED DESCRIPTION

Figure 1:
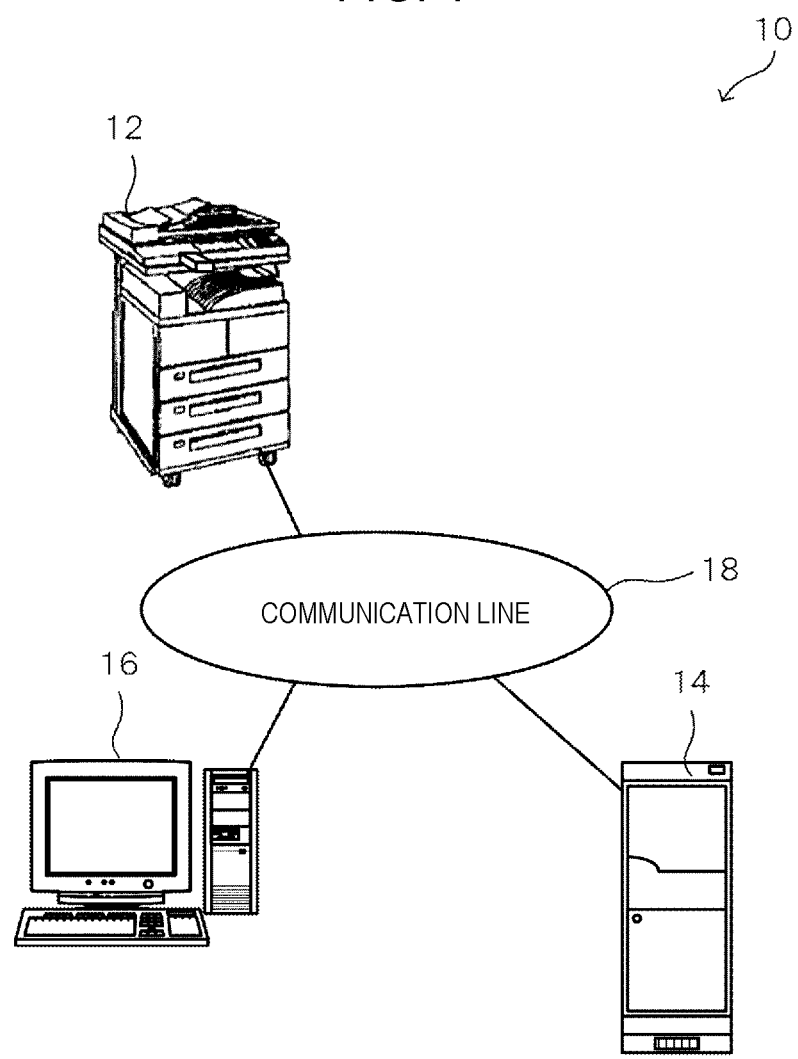
FIG. 1 is a diagram illustrating a schematic configuration of an information processing system according to an exemplary embodiment.

Hereinafter, an example of an exemplary embodiment according to the present disclosure will be described in detail with reference to the drawings. FIG. 1 is a diagram illustrating a schematic configuration of an information processing system according to the present exemplary embodiment.

As illustrated in FIG. 1, an information processing system 10 according to the present exemplary embodiment includes an image forming device 12, a server 14, and an information processing terminal 16. In the present exemplary embodiment, a single image forming device 12, a single server 14 (an example of an information processing device), and a single information processing terminal 16 are illustrated, whereas the number of each of them may be two or more. The image forming device 12 may be omitted. As the information processing terminal 16, a personal computer may be used, or a portable terminal such as a tablet terminal or a smartphone may be used.

The image forming device 12, the server 14, and the information processing terminal 16 are connected to one another via a communication line 18 such as a local area network (LAN), a wide area network (WAN), the Internet, or an intranet. Each of the image forming device 12, the server 14, and the information processing terminal 16 can mutually transmit and receive various data via the communication line 18.

Figure 2:
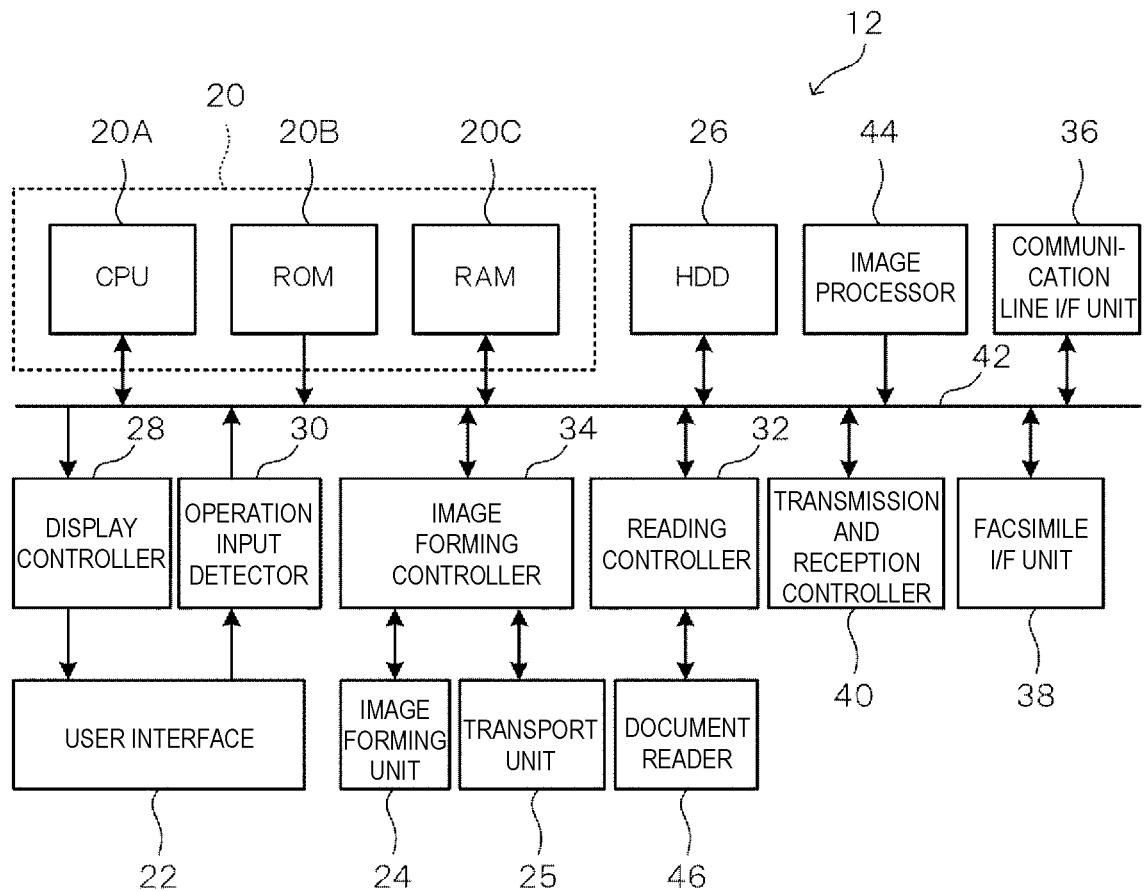
FIG. 2 is a block diagram illustrating a configuration of an electrical system of an image forming device according to the exemplary embodiment.

FIG. 2 is a block diagram illustrating a configuration of an electrical system of the image forming device 12 according to the present exemplary embodiment.

As illustrated in FIG. 2, the image forming device 12 according to the present exemplary embodiment includes a control unit 20 including a central processing unit (CPU) 20A, a read only memory (ROM) 20B, and a random access memory (RAM) 20C. The CPU 20A controls an overall operation of the image forming device 12. The RAM 20C is used as a work area or the like when the CPU 20A executes various programs. The ROM 20B stores various control programs, various parameters, and the like in advance. In the image forming device 12, each unit of the control unit 20 is electrically connected by a system bus 42.

Meanwhile, the image forming device 12 according to the present exemplary embodiment includes a hard disk drive (HDD) 26 that stores various data, application programs, and the like. The image forming device 12 also includes a display controller 28 that is connected to a user interface 22 and controls displaying of various operation screens and the like on a display of the user interface 22. The image forming device 12 includes an operation input detector 30 that is connected to the user interface 22 and detects an operation instruction input via the user interface 22. In the image forming device 12, the HDD 26, the display controller 28, and the operation input detector 30 are electrically connected to the system bus 42. Description will be made on an example in which the image forming device 12 according to the present exemplary embodiment includes the HDD 26, below. It is noted that the image forming device 12 is not limited to this example. The image forming device 12 may include a non-volatile storage such as a flash memory.

The image forming device 12 according to the present exemplary embodiment includes a reading controller 32 and an image forming controller 34. The reading controller 32 controls an optical image reading operation by a document reader 46 and a document feeding operation by a document transport unit. The image forming controller 34 controls an image forming process by an image forming unit 24 and transport of a sheet to the image forming unit 24 by a transport unit 25. The image forming device 12 includes a communication line interface (communication line I/F) unit 36 and an image processor 44. The communication line interface unit 36 is connected to the communication line 18 and transmits and receives communication data to and from other external devices such as the server 14 connected to the communication line 18. The image processor 44 performs various types of image processing. The image forming device 12 includes a facsimile interface (facsimile I/F) unit 38 that is connected to a telephone line (not shown) and transmits and receives facsimile data to and from a facsimile device connected to the telephone line. The image forming device 12 further includes a transmission and reception controller 40 that controls transmission and reception of the facsimile data via the facsimile interface unit 38. In the image forming device 12, the transmission and reception controller 40, the reading controller 32, the image forming controller 34, the communication line interface unit 36, the facsimile interface unit 38, and the image processor 44 are electrically connected to the system bus 42.

With the above configuration, the image forming device 12 according to the present exemplary embodiment causes the CPU 20A to access the RAM 20C, the ROM 20B, and the HDD 26. The image forming device 12 controls, using the CPU 20A, display of an operation screen and information such as various messages on the display of the user interface 22 via the display controller 28. The image forming device 12 controls, using the CPU 20A, operations of the document reader 46 and the document transport unit via the reading controller 32. The image forming device 12 controls, using the CPU 20A, operations of the image forming unit 24 and the transport unit 25 via the image forming controller 34, and controls, using the CPU 20A, transmission and reception of communication data via the communication line interface unit 36. The image forming device 12 controls, using the CPU 20A, the transmission and reception controller 40 to transmit and receive the facsimile data via the facsimile interface unit 38. Further, the image forming device 12 grasps, using the CPU 20A, a content of an operation performed on the user interface 22 based on operation information detected by the operation input detector 30, and executes various types of control based on the content of the operation.

Figure 3:
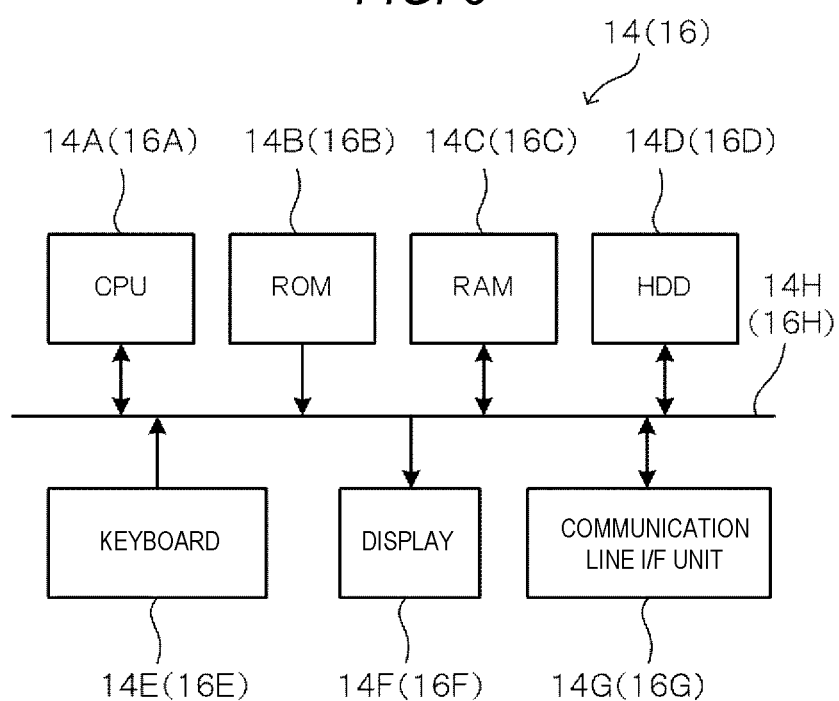
FIG. 3 is a block diagram illustrating a configuration of an electrical system of a server and an information processing terminal according to the exemplary embodiment.

Next, a configuration of an electrical system of the server 14 and the information processing terminal 16 according to the present exemplary embodiment will be described. FIG. 3 is a block diagram illustrating the configuration of the electrical system of the server 14 and the information processing terminal 16 according to the present exemplary embodiment. Since each of the server 14 and the information processing terminal 16 basically has a configuration of a general computer, the server 14 will be described as a representative, and a description of the information processing terminal 16 will be omitted.

As illustrated in FIG. 3, the server 14 according to the present exemplary embodiment includes a CPU 14A, a ROM 14B, a RAM 14C, an HDD 14D, a keyboard 14E, a display 14F, and a communication line interface (I/F) unit 14G. The CPU 14A controls an overall operation of the server 14. The ROM 14B stores various control programs, various parameters, and the like in advance. The RAM 14C is used as a work area or the like when the CPU 14A executes various programs. The HDD 14D stores various data, application programs, and the like. The keyboard 14E is used to input various information. The display 14F is used to display various information. The communication line interface unit 14G is connected to the communication line 18, and transmits and receives various data to and from other devices connected to the communication line 18. The units of the server 14 described above are electrically connected to one another by a system bus 14H. Description will be made on an example in which the server 14 according to the present exemplary embodiment includes the HDD 14D, below. It is noted that the server 14 is not limited to this example. The server 14 may include another non-volatile storage such as a flash memory.

With the above configuration, the server 14 according to the present exemplary embodiment causes the CPU 14A to access the ROM 14B, the RAM 14C, and the HDD 14D, acquire various data via the keyboard 14E, and display various information on the display 14F. The server 14 controls, using the CPU 14A, transmission and reception of communication data via the communication line interface unit 14G.

By the way, in an accounting work, a payment process includes confirming a payment amount based on an invoice, transferring the payment amount, performing an accounting process such as creating of a disbursement slip and bookkeeping, and marking the items as cleared. Among these, in order to confirm the payment amount based on the invoice, it is necessary to achieve consistency of the amount of money and content between a voucher such as a delivery note and the invoice. The operation is often performed visually by an accounting personnel, which may take a lot of time and effort. Therefore, in the information processing system 10 according to the present exemplary embodiment having the above described configuration, the accounting personnel operates the information processing terminal 16 to access the server 14 and request reconciliation between the invoice and a related document. In response, the server 14 reconciles the invoice with the related document to determine the consistency therebetween, and performs a process of outputting a suggestion as to a predetermined matter that is to be executed next in accordance with the inconsistency.

The information processing terminal 16 may perform a process of creating the invoice and registering the invoice in the server 14, or may perform a process of registering the related document in the server 14 or the like. The registration of the invoice or the related document may be performed by reading the invoice or the related document with the image forming device 12 and registering the invoice or the related document in the server 14. In the present exemplary embodiment, the related document may be a voucher such as a delivery note or a contract, or may include a document or the like for specifying a person in charge in addition to the voucher.

Figure 4:
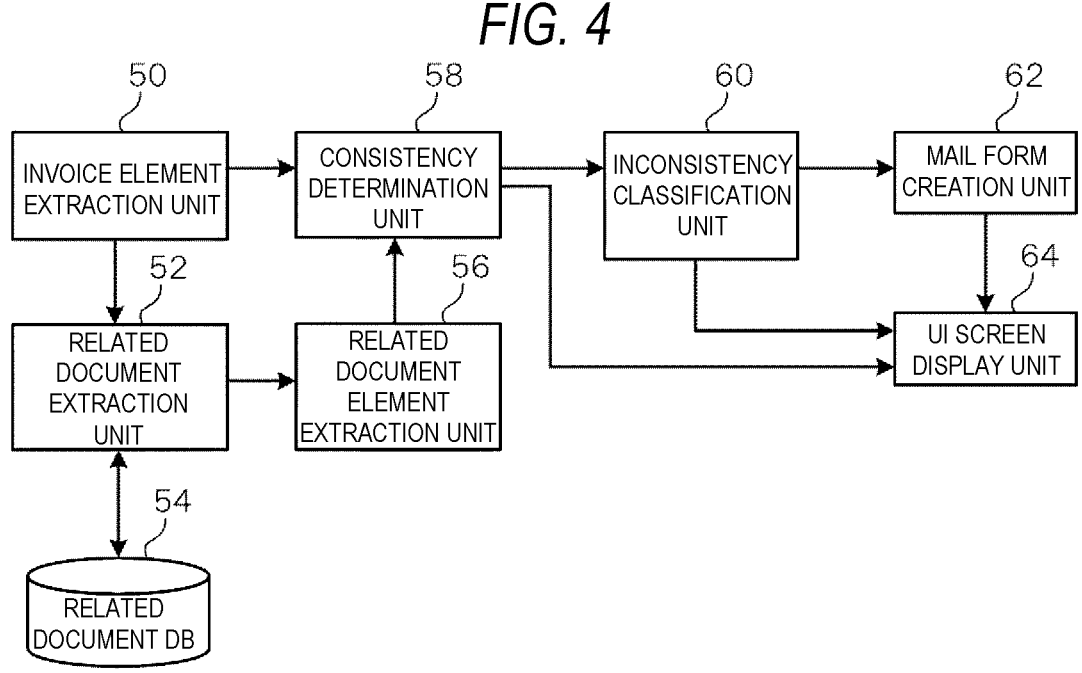
FIG. 4 is a functional block diagram illustrating a functional configuration of the server in the information processing system according to the exemplary embodiment.

Next, a functional configuration implemented by the CPU 14A of the server 14 executing a program stored in the ROM 14B will be described. FIG. 4 is a functional block diagram illustrating the functional configuration of the server 14 in the information processing system 10 according to the present exemplary embodiment.

The server 14 has functions of an invoice element extraction unit 50, a related document extraction unit 52, a related document element extraction unit 56, a consistency determination unit 58, an inconsistency classification unit 60, a mail form creation unit 62, and a UI screen display unit 64.

The invoice element extraction unit 50 extracts, from the invoice, a predetermined element used in confirming a payment amount. As examples of the predetermined element, an issuer, a product name, an amount of money, and the like are extracted. For example, when an invoice created in paper is read by the image forming device 12, an element used in confirming the payment amount is extracted by optical character recognition (OCR). When the invoice is created by the information processing terminal 16, an element used in confirming the payment amount is extracted from document information representing the invoice.

The related document extraction unit 52 extracts a document related to the invoice to be processed from a related document DB 54. For example, related documents having the same management number are extracted from the related document DB 54 based on a management number extracted by the invoice element extraction unit 50.

The related document DB 54 is a database of the related documents including a voucher related to an invoice such as a quotation and delivery office information, information on an applicant, and the like. It is assumed that the related document DB 54 is constructed in the server 14. It is noted that the related document DB 54 may be constructed in an external server other than the server 14.

The related document element extraction unit 56 extracts a predetermined element used in confirming a payment amount from the related document extracted by the related document extraction unit 52. For example, when the invoice created in paper is read by the image forming device 12, the element used in confirming the payment amount is extracted by the OCR. When the invoice is created by the information processing terminal 16, an element is extracted from document information representing the invoice.

The consistency determination unit 58 reconciles the element of the invoice extracted by the invoice element extraction unit 50 with the element of the related document extracted by the related document element extraction unit 56 to determine the consistency.

When an inconsistency exists as a result of reconciling the element of the invoice and the element of the related document by the consistency determination unit 58, the inconsistency classification unit 60 calculates a magnitude of a difference between the elements, and classifies an inconsistency.

The mail form creation unit 62 creates a mail form of an e-mail for inquiring a person in charge of application when there is an issue to be dealt with by the person in charge of application. When the mail form is created, a mail address of the person in charge of application may be acquired from the related document DB 54 or the like and set the acquired mail address as a transmission address of the mail form.

According to a consistency determination result by the consistency determination unit 58, the UI screen display unit 64 performs a process of displaying a screen for issuing a next instruction to the accounting personnel as the suggestion as to the matter to be executed next.

In the present exemplary embodiment, the information processing terminal 16 of the accounting personnel performs a process of displaying a screen corresponding to the consistency determination result as the suggestion as to the matter to be executed next.

Figure 5:
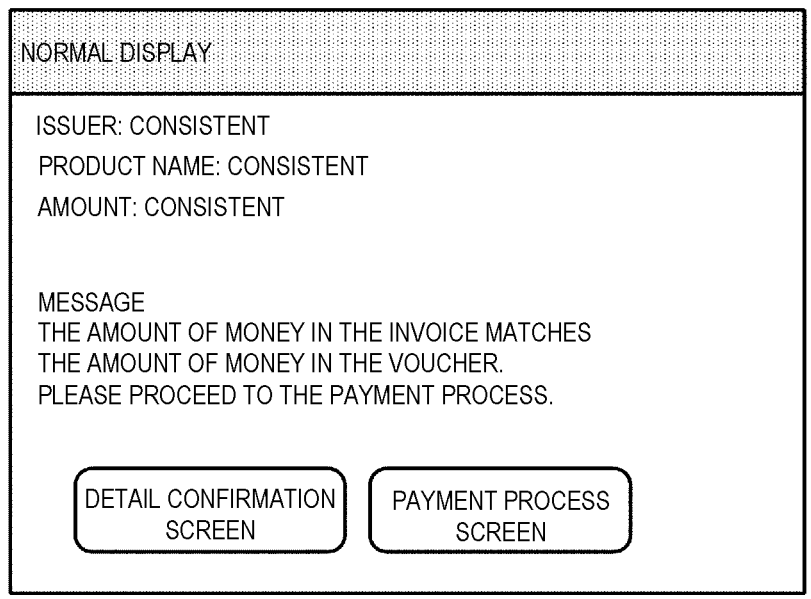
FIG. 5 is a diagram illustrating an example of a normal display screen when consistency between an invoice and a related document is determined to be normal.

Here, a screen example that corresponds to the consistency determination result and that is displayed by the UI screen display unit 64 will be described. FIG. 5 is a diagram illustrating an example of a normal display screen when the consistency between the invoice and the related document is determined to be normal.

Figure 6:
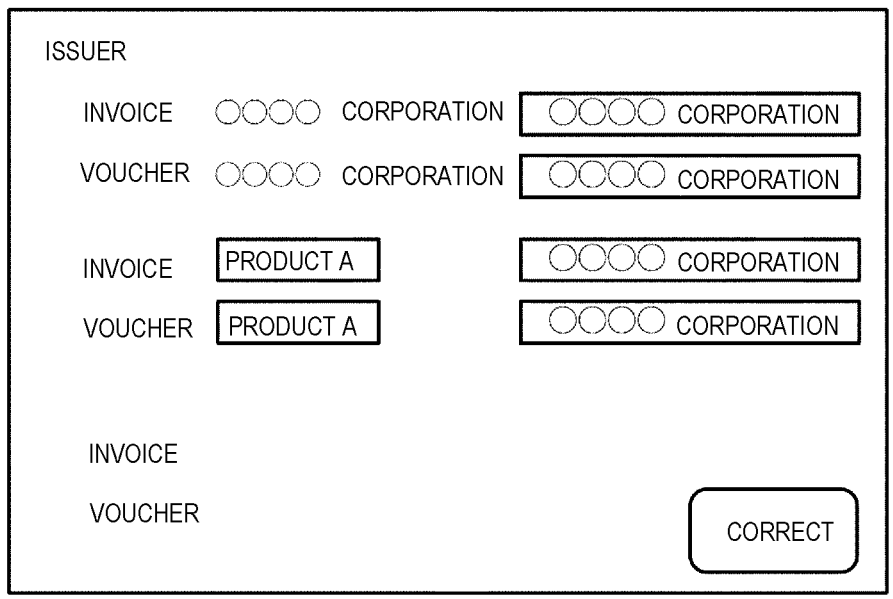
FIG. 6 is a diagram illustrating an example of a detail confirmation screen.

When the consistency between the invoice and the related document is determined to be normal, the normal display screen illustrated in FIG. 5 is displayed. In the example of the normal display screen in FIG. 5, the issuer, the product name, and the amount of money are extracted as elements and each of the elements is displayed as normal. A message of "The amount of money in the invoice matches the amount of money in the voucher. Please proceed to the payment process." is displayed. In the example of the normal display screen in FIG. 5, a "detail confirmation screen" button and a "payment process screen" button are displayed as examples of a procedure for shifting to a matter to be executed next. When an operation of selecting any of the buttons is performed, a screen corresponding to the selected button is displayed. For example, when the operation of selecting the "detail confirmation screen" button is performed, a detail confirmation screen illustrated in FIG. 6 is displayed as an example of a confirmation screen. FIG. 6 is a diagram illustrating a screen example of the detail confirmation screen. It is assumed that a company name and a product name have been extracted as elements extracted from each of the invoice and the voucher. In the detail confirmation screen of FIG. 6, images of the elements extracted from each of the invoice and the voucher and an OCR result of the elements are displayed in association with each other. In the screen example in FIG. 6, when a correction is to be made to the OCR result, a correction content is input, and a "correct" button illustrated in FIG. 6 is tapped to request the correction, so that the server 14 receives the correction content and corrects the OCR result.

Figure 7:
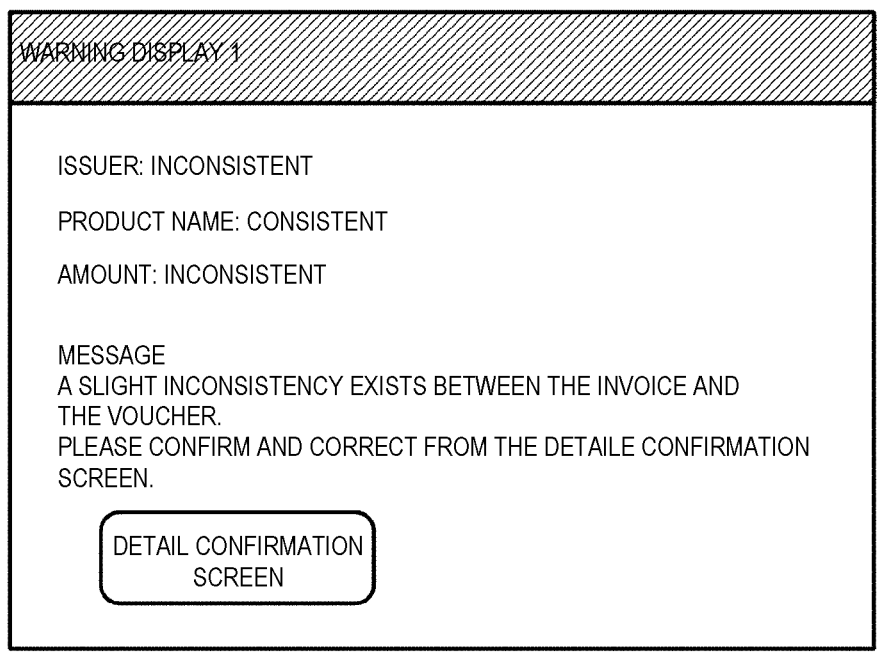
FIG. 7 is a diagram illustrating a screen example of a warning display 1 when the consistency between the invoice and the related document is determined to be slightly inconsistent.

FIG. 7 is a diagram illustrating a screen example of a warning display 1 when the consistency between the invoice and the related document is determined to be slightly inconsistent.

When the consistency between the invoice and the related document is determined to be slightly inconsistent, a screen of the warning display 1 illustrated in FIG. 7 is displayed. In the screen example of the warning display 1 in FIG. 7, it is displayed that the product names are consistent, and the issuers and the amounts of money are inconsistent. A message of "A slight inconsistency exists between the invoice and the voucher. Please confirm and correct from the detail confirmation screen" is displayed. In the screen example of the warning display 1 in FIG. 7, the "detail confirmation screen" button is displayed. When an operation of selecting the "detail confirmation screen" button is performed, the detail confirmation screen illustrated in FIG. 6 is displayed.

Figure 8:
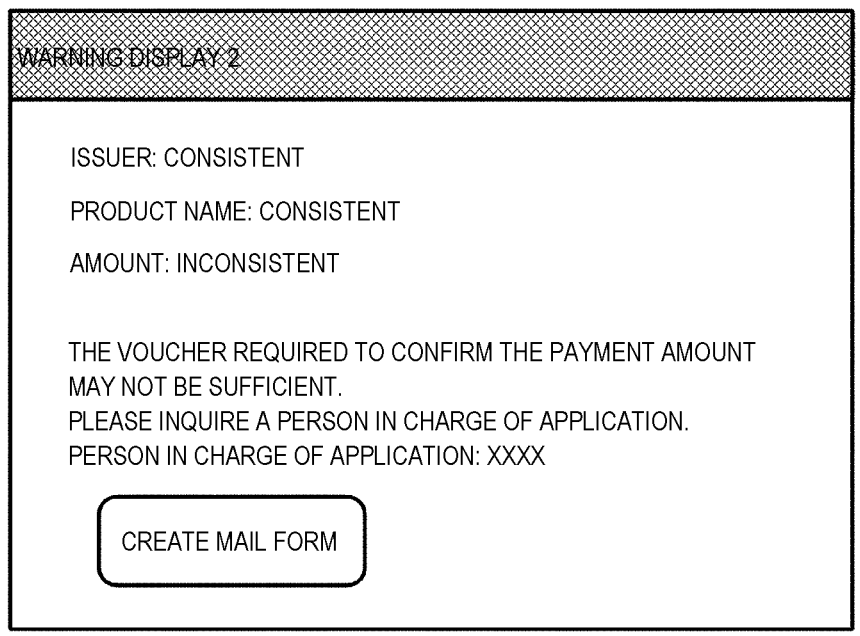
FIG. 8 is a diagram illustrating a screen example of a warning display 2 when the consistency between the invoice and the related document is determined to be inconsistent, which requires to inquire a person in charge of application.

FIG. 8 is a diagram illustrating a screen example of a warning display 2 when the consistency between the invoice and the related document is determined to be inconsistent, which requires to inquire the person in charge of application. In the present exemplary embodiment, the warning display 2 is a warning having a higher level of inconsistency than the warning display 1 has.

When the consistency between the invoice and the related document is determined to be inconsistent, which requires to inquire the person in charge of application, the screen of the warning display 2 illustrated in FIG. 8 is displayed. In the screen of the warning display 2 in FIG. 8, it is displayed that the issuers and the product names are consistent and the amounts of money are inconsistent. A message of "The voucher required to confirm the payment amount may not be sufficient. Please inquire a person in charge of application. Person in charge of application: XXX" is displayed. In the screen example of the warning display 2 in FIG. 8, a "create mail form" button is displayed as an example of a procedure for shifting to a matter to be executed next. When an operation of selecting the "create mail form" button is performed, a predetermined mail form is created and a screen is displayed.

Figure 9:
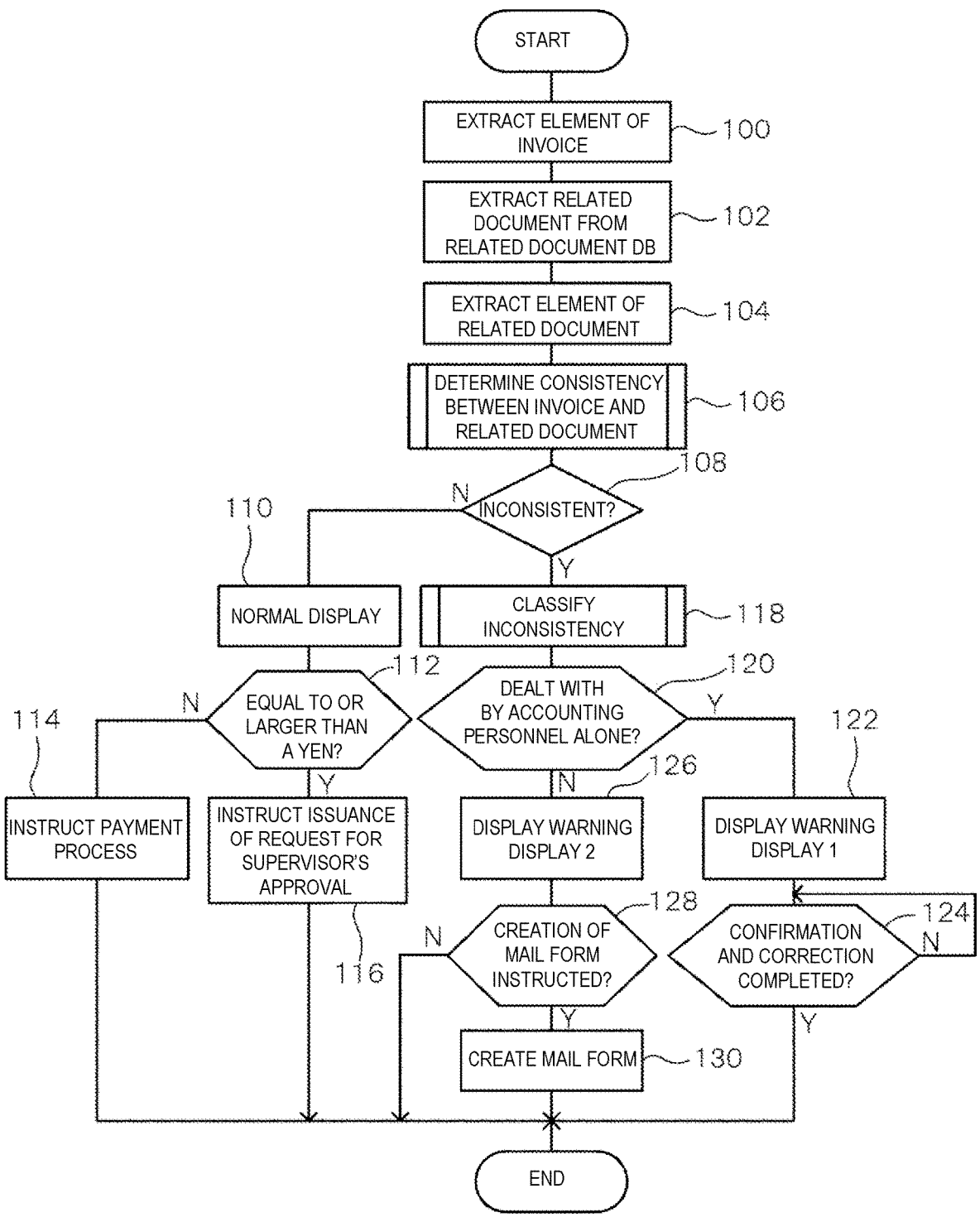
FIG. 9 is a flowchart of an example of a specific process performed by the server of the information processing system according to the present exemplary embodiment.

Next, a specific process performed by the information processing system 10 according to the present exemplary embodiment as described above will be described. FIG. 9 is a flowchart of an example of the specific process performed by the server 14 of the information processing system 10 according to the present exemplary embodiment. In the present exemplary embodiment, the process in FIG. 9 is started when the accounting personnel operates the information processing terminal 16 to access the server 14 and request the reconciliation between the invoice and the related document. The process may be started at another timing. For example, the process may be started when a predetermined date and time is reached, or when the number of invoices applied from the image forming device 12 or the information processing terminal 16 to the server 14 reaches a predetermined number. The invoice and the related document may be registered in the server 14 by, for example, operating the image forming device 12 or the information processing terminal 16 to transmit a result of reading target documents with the image forming device 12 to the server 14. Alternatively, the invoice or the related document created by the information processing terminal 16 may be transmitted to the server 14 and registered.

In step 100, the CPU 14A extracts an element of the invoice, and the CPU 14A proceeds to step 102. That is, the invoice element extraction unit 50 extracts a predetermined element used in confirming the payment amount from the invoice. For example, when the invoice created in paper is read by the image forming device 12, the element used in confirming the payment amount is extracted by the OCR. When the invoice is created by the information processing terminal 16, the element used in confirming the payment amount is extracted from document information representing the invoice.

In step 102, the CPU 14A extracts a related document from the related document DB 54, and the CPU 14A proceeds to step 104. That is, the related document extraction unit 52 extracts a document related to the invoice to be processed from the related document DB 54. For example, related documents having the same management number are extracted from the related document DB 54 based on a management number extracted by the invoice element extraction unit 50.

In step 104, the CPU 14A extracts an element of the related document, and the CPU 14A proceeds to step 106. That is, the related document element extraction unit 56 extracts an element used in confirming the payment amount from the related document extracted by the related document extraction unit 52. For example, when the invoice created in paper is read by the image forming device 12, the element used in confirming the payment amount is extracted by the OCR. When the invoice is created by the information processing terminal 16, an element is extracted from document information representing the invoice.

In step 106, the CPU 14A determines a consistency between the invoice and the related document, and the CPU 14A proceeds to step 108. That is, the consistency determination unit 58 reconciles the element of the invoice extracted by the invoice element extraction unit 50 with the element of the related document extracted by the related document element extraction unit 56 to determine the consistency therebetween. Details of the consistency determination will be described later.

In step 108, the CPU 14A determines whether an inconsistency exists based on a result of determining the consistency between the invoice and the related document. When the determination is No, the CPU 14A proceeds to step 110. When the determination is Yes, the CPU 14A proceeds to step 118.

In step 110, the CPU 14A performs normal display, and the CPU 14A proceeds to step 112. That is, the UI screen display unit 64 performs display for issuing a next instruction to the accounting personnel in accordance with the consistency determination result by the consistency determination unit 58. For example, by transmitting information for displaying the normal display screen illustrated in FIG. 5 to the information processing terminal 16 or the image forming device 12 operated by the accounting personnel, the normal display screen is displayed on the information processing terminal 16 or the image forming device 12.

In step 112, the CPU 14A determines whether the amount of money in the invoice is equal to or larger than a predetermined amount of money ("A yen" in FIG. 9). When the determination is No, the CPU 14A proceeds to step 114. When the determination is Yes, the CPU 14A proceeds to step 116.

In step 114, the CPU 14A instructs execution of the payment process and ends a series of processes. That is, since the consistency determination result by the consistency determination unit 58 is normal, the UI screen display unit 64 performs display for issuing an instruction of the payment process as a next instruction. For example, the information processing terminal 16 or the image forming device 12 operated by the accounting personnel displays that the payment process is to be performed as a next process.

In step 116, the CPU 14A instructs issuance of a request for a supervisor's approval and ends a series of processes. That is, although the consistency determination result by the consistency determination unit 58 is normal, the amount of money is to be approved by a supervisor. Therefore, the UI screen display unit 64 performs a display for issuing an instruction of the request for supervisor's approval as the next instruction. For example, the information processing terminal 16 or the image forming device 12 operated by the accounting personnel performs display for issuing the instruction of the request for supervisor's approval as a next process.

On the other hand, in step 118, the CPU 14A performs a process of classifying the inconsistency, and the CPU 14A proceeds to step 120. That is, when the inconsistency exists as a result of reconciling the element of the invoice and the element of the related document by the consistency determination unit 58, the inconsistency classification unit 60 calculates a magnitude of a difference between the elements, and classifies the inconsistency. Details of the process of classifying the inconsistency will be described later.

In step 120, the CPU 14A determines whether the inconsistency can be dealt with by the accounting personnel alone. Specifically, the CPU 14A determines whether a classification result of the inconsistency is a classification result that can be dealt with by the accounting personnel alone. When the determination is Yes, the CPU 14A proceeds to step 122. When the determination is No, the CPU 14A proceeds to step 126.

In step 122, the CPU 14A performs the warning display 1, and the CPU 14A proceeds to step 124. That is, the UI screen display unit 64 instructs confirmation and correction by displaying the warning display 1 as the display for issuing the next instruction to the accounting personnel in accordance with the consistency determination result by the consistency determination unit 58. For example, by transmitting information for displaying the screen of the warning display 1 illustrated in FIG. 7 to the information processing terminal 16 or the image forming device 12 operated by the accounting personnel, the screen of the warning display 1 is displayed on the information processing terminal 16 or the image forming device 12, to instruct the accounting personnel to make confirmation and correction.

In step 124, the CPU 14A determines whether the confirmation and correction is completed. Specifically, the CPU 14A determines whether the accounting personnel operates the "detail confirmation screen" button on the screen of the warning display 1 to display the detail confirmation screen in FIG. 6, corrects erroneous recognition of the OCR, erroneous input at the time of creating the invoice, or the like, and tap the "correct" button in FIG. 6. The process waits until the determination is Yes. Then, the series of processes end.

On the other hand, in step 126, the CPU 14A performs the warning display 2, and the CPU 14A proceeds to step 128. That is, the UI screen display unit 64 displays the warning display 2 as the display for issuing the next instruction to the accounting personnel in accordance with the consistency determination result by the consistency determination unit 58, so as to instruct the accounting personnel to inquire the person in charge of application. For example, by transmitting information for displaying the screen of the warning display 2 illustrated in FIG. 8 to the information processing terminal 16 or the information processing device 12 operated by the accounting personnel, the screen of the warning display 2 is displayed on the information processing terminal 16 or the image forming device 12, and the accounting personnel is instructed to inquire the applicant.

In step 128, the CPU 14A determines whether creation of the mail form is instructed. For example, the CPU 14A determines whether the "create mail form" button on the screen of the warning display 2 in FIG. 8 is tapped. When the determination is Yes, the CPU 14A proceeds to step 130. When the determination is No, the series of processes end.

In step 130, the CPU 14A creates a mail form and ends the series of processes. That is, the mail form creation unit 62 creates a mail form of an e-mail for inquiring the person in charge of application when there is an issue to be dealt with by the person in charge of application. When the mail form is created, the mail address of the person in charge of application may be acquired from the related document DB 54 or the like and set as the transmission address of the mail form.

Next, the consistency determination between the invoice and the related document in the step 106 will be described in detail. FIG. 10 is a flowchart of an example of a process of the consistency determination between the invoice and the related document.

In step 200, the CPU 14A determines whether the issuers match, and the CPU 14A proceeds to step 202. That is, the consistency determination unit 58 determines whether (i) the issuer which is an element extracted from the invoice and (ii) the issuer which is an element extracted from the related document such as the voucher match.

In step 202, the CPU 14A records a result of determining a consistency between the issuers, and the CPU 14A proceeds to step 204. For example, as illustrated in FIG. 11, the result of the match determination between the issuer of the related document and the issuer of the invoice is recorded in an issuer list.

In step 204, the CPU 14A determines whether product names match, and the CPU 14A proceeds to step 206. That is, the consistency determination unit 58 determines whether (i) a product name which is an element extracted from the invoice and (ii) a product name which is an element extracted from the related document such as the voucher match.

In step 206, the CPU 14A records the result of determining a consistency between the product names, and the CPU 14A proceeds to step 208. For example, as illustrated in FIG. 12, a result of the match determination between the product name of the related document and the product name of the invoice is recorded in a product name list.

In step 208, the CPU 14A digitizes character strings of amounts of money, and the CPU 14A proceeds to step 210. That is, the CPU 14A digitizes (i) a character string of an amount of money which is an element extracted from the invoice and (ii) a character string of an amount of money which is an element extracted from the related document such as the voucher. When the invoice and the related document are document information created by the information processing terminal 16, the character string of the amount of money is extracted from each of the invoice and the related document.

In step 210, the CPU 14A adds an amount of money in a related document which is currently processed to a total amount in the related documents, and the CPU 14A proceeds to step 212.

In step 212, the CPU 14A determines whether the document which is currently processed is a final related document. When the determination is No, the CPU 14A returns to step 200 to repeat the above-described processes. When the determination is Yes, the CPU 14A proceeds to step 214.

In step 214, the CPU 14A determines whether a billed amount and the total amount in the related documents match, and the CPU 14A proceeds to step 216. That is, the consistency determination unit 58 determines whether the billed amount and the total amount in the related documents match.

In step 216, the CPU 14A records a result of determining the consistency between the amounts of money, returns the result of determining the consistency between the invoice and the related document, and the CPU 14A proceeds to step 108 in FIG. 9. For example, as illustrated in FIG. 13, the result of the match determination between the billed amount and the total amount in the related documents is recorded in the list of amounts of money. In the example in FIG. 13, mismatch between the billed amount and the total amount in the related documents is recorded in the list of amounts of money.

Figure 14:
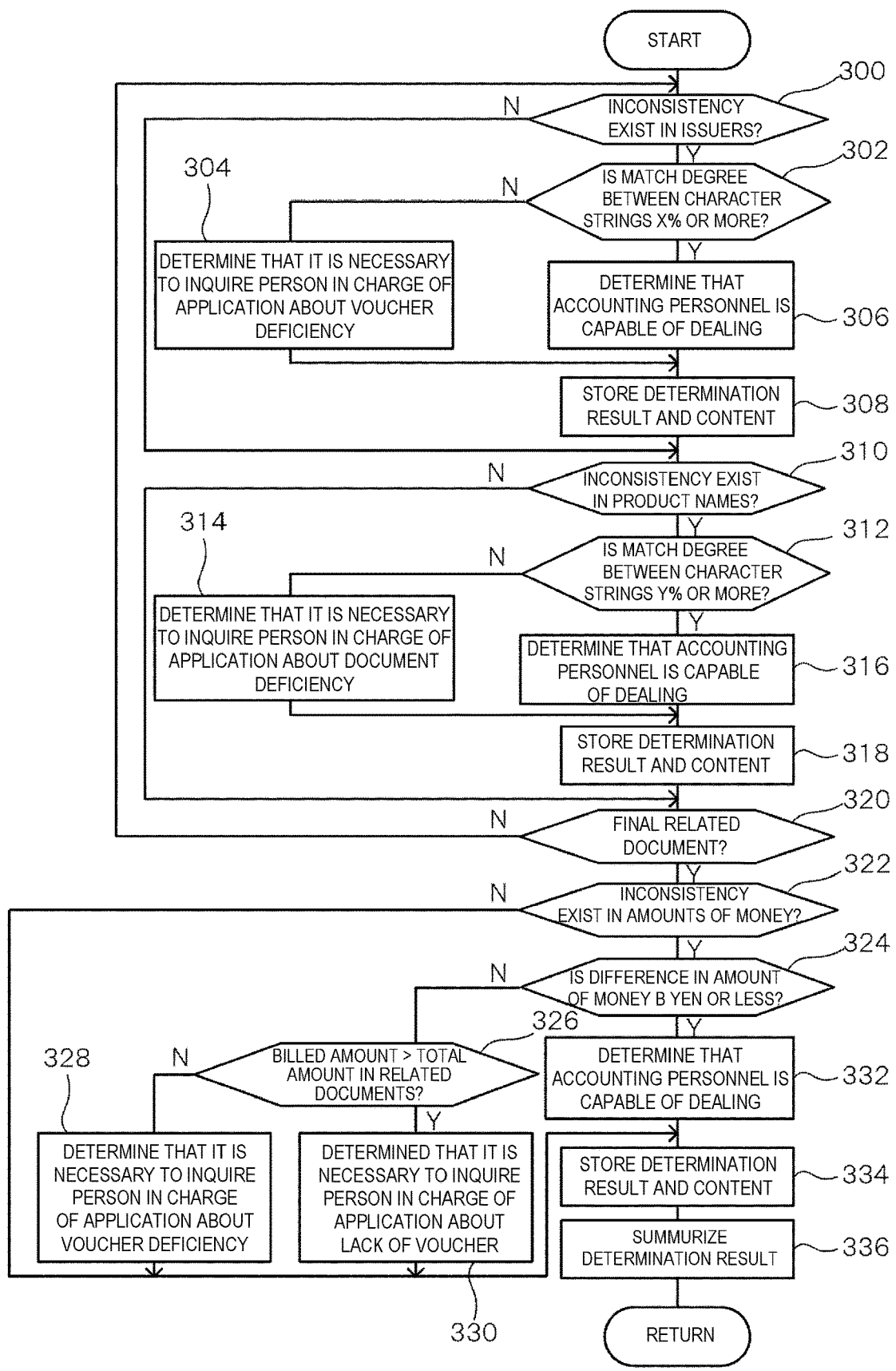
FIG. 14 is a flowchart of an example of a process for classifying inconsistencies.

Next, the process of classifying the inconsistency in the step 118 described above will be described in detail. FIG. 14 is a flowchart of an example of the process of classifying the inconsistency.

In step 300, the CPU 14A determines whether the inconsistency exists in the issuers. Specifically, the inconsistency classification unit 60 makes this determination based on the result of the match determination that has been recorded in the issuer list by the processes in FIG. 10. When the determination is Yes, the CPU 14A proceeds to step 302. When the determination is No, the CPU 14A proceeds to step 310.

In step 302, the CPU 14A determines whether a match degree between the character strings of the issuers is equal to or larger than X % where X is a predetermined value. Specifically, the inconsistency classification unit 60 determines whether the match degree between the character strings of the issuers is equal to or larger than a predetermined threshold value such as 80%. When the determination is No, the CPU 14A proceeds to step 304. When the determination is Yes, the CPU 14A proceeds to step 306. For example, X % is 80% or 90%.

In step 304, the CPU 14A determines that it is necessary to inquire the person in charge of application about document deficiency, and the CPU 14A proceeds to step 308. That is, the inconsistency classification unit 60 determines that it is necessary to inquire about the deficiency of the related document such as the voucher.

In step 306, the CPU 14A determines that the accounting personnel is capable of dealing with the inconsistency, and the CPU 14A proceeds to step 308. That is, the inconsistency classification unit 60 determines that the inconsistency between the issuers is slight and can be dealt with by the accounting personnel alone.

In step 308, the CPU 14A stores the determination result and the content in step 304 or step 306, and the CPU 14A proceeds to step 310.

In step 310, the CPU 14A determines whether the inconsistency exists in the product names. Specifically, the inconsistency classification unit 60 makes this determination based on the result of the match determination that has been recorded in the product name list by the processes in FIG. 14. When the determination is Yes, the CPU 14A proceeds to step 312. When the determination is No, the CPU 14A proceeds to step 320.

In step 312, the CPU 14A determines whether a match degree between the character strings of the product names is equal to or larger than Y % where Y is a predetermined value. Specifically, the inconsistency classification unit 60 determines whether the match degree between the character strings of the product names is equal to or larger than a predetermined threshold value such as 80%. When the determination is No, the CPU 14A proceeds to step 314. When the determination is Yes, the CPU 14A proceeds to step 316. For example, Y % is 80% or 90%.

In step 314, the CPU 14A determines that it is necessary to inquire the person in charge of application about the document deficiency, and the CPU 14A proceeds to step 318. That is, the inconsistency classification unit 60 determines that it is necessary to inquire about the deficiency of the related document such as the voucher.

In step 316, the CPU 14A determines that the accounting personnel is capable of dealing with the inconsistency, and the CPU 14A proceeds to step 318. That is, the inconsistency classification unit 60 determines that the inconsistency between the product names is slight and can be dealt with by the accounting personnel alone.

In step 318, the CPU 14A stores the determination result and the content in step 314 or step 316 in the HDD 14D or the like, and the CPU 14A proceeds to step 320.

In step 320, the CPU 14A determines whether the document which is currently processed is a final related document. Specifically, the inconsistency classification unit 60 determines whether the processes described above have been performed on all the vouchers extracted as the related documents. When the determination is No, the CPU 14A returns to step 300 to repeat the processes described above. When the determination is Yes, the CPU 14A proceeds to step 322.

In step 322, the CPU 14A determines whether the inconsistency exists in the amounts of money. Specifically, the inconsistency classification unit 60 makes this determination based on the result of the match determination that has been recorded in the list of amounts of money by the processes in FIG. 14. When the determination is Yes, the CPU 14A proceeds to step 324. When the determination is No, the CPU 14A proceeds to step 332.

In step 324, the CPU 14A determines whether a difference in the amount of money is equal to or less than B yen where B is a predetermined value. Specifically, the inconsistency classification unit 60 determines whether the inconsistency between the amounts of money is equal to or less than a predetermined amount of money. When the determination is No, the CPU 14A proceeds to step 326. When the determination is Yes, the CPU 14A proceeds to step 332.

In step 326, the CPU 14A determines whether the billed amount is larger than the total amount in the related documents. When the determination is No, the CPU 14A proceeds to step 328. When the determination is Yes, the CPU 14A proceeds to step 330.

In step 328, the CPU 14A determines that it is necessary to inquire the person in charge of application about the document deficiency, and the CPU 14A proceeds to step 334. That is, the inconsistency classification unit 60 determines that it is necessary to inquire about the deficiency of the related document such as the voucher. The invoice may be wrong. Even in that case, when the accounting personnel inquires about the deficiency of the related document, the person in charge of application notices an error of the invoice. Therefore, in the present exemplary embodiment, as an example, the person in charge of application is inquired that there is a possibility of the deficiency of the related document such as the voucher.

In step 330, the CPU 14A determines that it is necessary to inquire the person in charge of application about a lack of a voucher, and the CPU 14A proceeds to step 334. That is, the inconsistency classification unit 60 determines that it is necessary to inquire the person in charge of application because of the lack of the related document such as the voucher. The invoice may be wrong. Even in that case, when the accounting personnel inquires about the lack of the related document, the person in charge of application notices an error of the invoice. Therefore, in the present exemplary embodiment, as an example, the person in charge of application is inquired that there is a possibility of the lack of the voucher.

Meanwhile, in step 332, the CPU 14A determines that the accounting personnel is capable of dealing with the inconsistency, and the CPU 14A proceeds to step 334. In other words, the inconsistency classification unit 60 determines that the inconsistency arises because of, for example, slight erroneous recognition in the OCR and that the accounting personnel can deal with the inconsistency.

In step 334, the determination result and the content in step 328 or step 330 are stored in the HDD 14D or the like, and the CPU 14A proceeds to step 336.

In step 336, the CPU 14A summarizes the determination results and returns the results of classifying the inconsistencies, and the CPU 14A proceeds to step 120 in FIG. 9.

Figure 15:
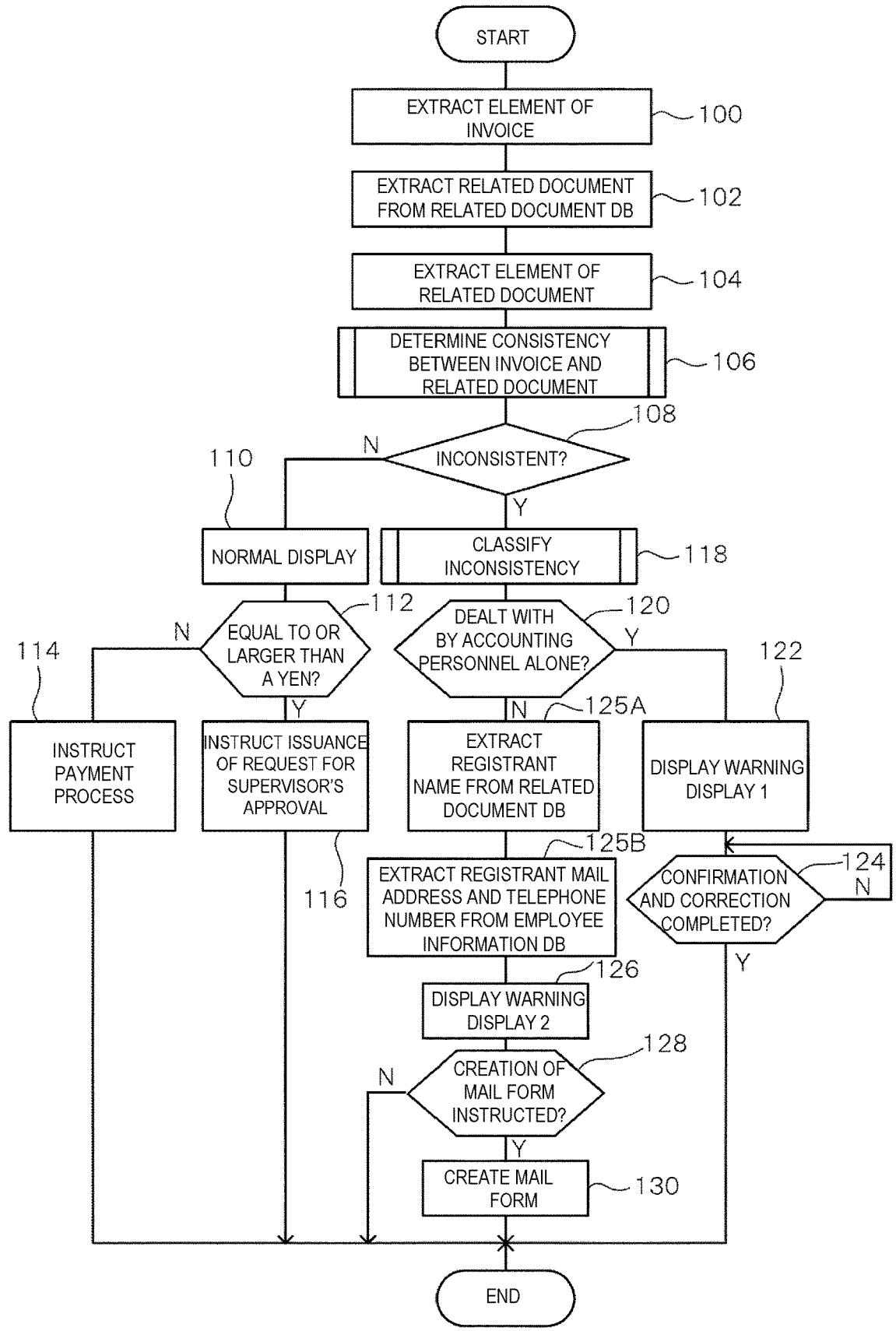
FIG. 15 is a flowchart of a modified example of a specific process performed by the server of the information processing system according to the exemplary embodiment.

In the process in FIG. 9, when the screen of the warning display 2 is displayed, contact information such as the e-mail address or a telephone number of the person in charge of application may be displayed. For example, as illustrated in FIG. 15, processes of steps 125A and 125B may be added to the process in FIG. 9. FIG. 15 is a flowchart of a modified example of the specific process performed by the server 14 of the information processing system 10 according to the present exemplary embodiment. The same processes as those in FIG. 9 are denoted by the same reference numeral, and the following description will focus on differences.

That is, in step 120, when determining that the inconsistency can be deal with by the accounting personnel alone, the CPU 14A proceeds to step 125A.

In step 125A, the CPU 14A extracts a registrant name from the related document DB 54, and the CPU 14A proceeds to step 125B.

In step 125B, the CPU 14A extracts a registrant mail address and telephone number from an employee information DB, and the CPU 14A proceeds to step 126. The employee information DB may be constructed in an external server other than the server 14, or may be constructed in the server 14.

Accordingly, in step 126, the registrant mail address and telephone number and the like are displayed on the screen of the warning display 2 to be notified to the accounting personnel, which eliminates the need of searching for the contact information of the person in charge of application.

In the exemplary embodiment described above, even if the inconsistency does not exist, when the billed amount or the like deviates from a past tendency, a warning display for warning to that effect may be output. For example, it is assumed that more than a predetermined amount of money has not been billed from Company A before. In this case, if a billed amount in an invoice from Company A exceeds the predetermined amount of money, a warning may be issued. Specifically, when the determination in step 108 in FIG. 9 is No, the CPU 14A may determine whether there is a deviation from the past tendency by a predetermined threshold value or more. When the determination is Yes, the warning display may be output. When the determination is No, the CPU 14A proceeds to step 110. As a method of detecting an outlier, machine learning may be used to detect the outlier.

Further, in the above-described exemplary embodiment, when the inconsistency exists between the element extracted from the invoice and the element extracted from the related document, the warning display 1 or the warning display 2 is displayed according to the match degree. It is noted that the present disclosure is not limited thereto. For example, a suggestion as to a matter to be executed next may be output in accordance with an inconsistent item. Specifically, when the inconsistent item is a product name, a warning screen for warning of slight inconsistency is displayed, and when the inconsistent item is an amount of money, a warning screen B which requires to inquire the person in charge of application is displayed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the image forming device 12 of the information processing system 10 according to the above-described exemplary embodiment may be processing performed by software, processing performed by hardware, or processing combining both. The processing performed in each unit of the image forming device 12 may be stored as a program in a storage medium such as a compact disc read only memory (CD-ROM), a digital versatile disc read only memory (DVD-ROM), or a universal serial bus (USB) memory and distributed. The program may be downloaded from an external device via a network.

Further, the present disclosure is not limited to the above, and it is needless to say that various modifications other than the above can be implemented within a range not departing from the scope of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
acquire an invoice to be processed;
extract a predetermined element from the invoice;
acquire a document related to the invoice;

extract a predetermined element from the document; and perform a process of outputting a suggestion as to a predetermined matter that is to be executed next in accordance with an inconsistency between a content described in the invoice and a content described in the document, based on a determination of a difference between the predetermined element extracted from the invoice and the predetermined element extracted from the document; and even when the inconsistency does not exist, but the contents are deviated from a past tendency, further perform a process of outputting a suggestion that prompts confirmation.

2. The information processing device according to claim 1, wherein the processor is configured to, even when the content described in the invoice and the content described in the document are consistent with each other, perform the process of outputting the suggestion.

3. The information processing device according to claim 2, wherein the processor is configured to classify the inconsistency into any of levels and output the suggestion.

4. The information processing device according to claim 3, wherein the processor is configured to acquire information on a person related to the document and output the information as the suggestion.

5. The information processing device according to claim 2, wherein the processor is configured to acquire information on a person related to the document and output the information as the suggestion.

6. The information processing device according to claim 2, wherein the processor is configured to perform a process of further outputting a procedure for shifting to the predetermined matter to be executed next in the suggestion.

7. The information processing device according to claim 1, wherein the processor is configured to classify the inconsistency into any of levels and output the suggestion.

8. The information processing device according to claim 7, wherein the processor is configured to acquire information on a person related to the document and output the information as the suggestion.

9. The information processing device according to claim 7, wherein the processor is configured to perform a process of further outputting a procedure for shifting to the predetermined matter to be executed next in the suggestion.

10. The information processing device according to claim 1, wherein the processor is configured to acquire information on a person related to the document and output the information as the suggestion.

11. The information processing device according to claim 10, wherein the processor is configured to perform a process of further outputting a procedure for shifting to the predetermined matter to be executed next in the suggestion.

12. The information processing device according to claim 1, wherein the processor is configured to perform a process of further outputting a procedure for shifting to the predetermined matter to be executed next in the suggestion.

13. The information processing device according to claim 12, wherein the processor is configured to, when creation of an e-mail is output as the procedure and selected, perform a process of creating a predetermined mail form.

14. The information processing device according to claim 13, wherein the processor is configured to, when creating the predetermined mail form, further perform a process of acquiring a target e-mail address and set the acquired e-mail address in the predetermined mail form.

15. The information processing device according to claim 12, wherein the processor is configured to, when an instruction of confirmation and correction is output as the procedure and selected, perform a process of outputting a confirmation screen for confirming the inconsistency.

16. The information processing device according to claim 15, wherein the processor is configured to further perform a process of receiving a correction content from the confirmation screen.

17. An information processing system comprising:

the information processing device according to claim 1; and an information processing terminal configured to:
request the information processing device to make reconciliation between the invoice and the document; and perform a process of receiving and displaying the suggestion.

18. A non-transitory computer readable medium storing a program that cases a computer to execute information processing, the information processing comprising:

acquiring an invoice to be processed;

extracting a predetermined element from the invoice;

acquiring a document related to the invoice;

extracting a predetermined element from the document; and performing a process of outputting a suggestion as to a predetermined matter that is to be executed next in accordance with an inconsistency between a content described in the invoice and a content described in the document, based on a determination of a difference between the predetermined element extracted from the invoice and the predetermined element extracted from the document; and even when the inconsistency does not exist, but the contents are deviated from a past tendency, further performing a process of outputting a suggestion that prompts confirmation.

19. The information processing device according to claim 1, wherein a processor configured to:
extract an identifier from the invoice; and
acquire the document related to the invoice from a database, the related document being acquired from the database based on the document having a same identifier as the identifier extracted from the invoice.

* * * * *